United States Patent
Heegard

(10) Patent No.: US 7,184,412 B2
(45) Date of Patent: Feb. 27, 2007

(54) METHOD OF INCREASING DATA RATE IN A WIRELESS DATA COMMUNICATION NETWORK VIA CLOCK SWITCHING

(75) Inventor: Chris Heegard, Santa Rosa, CA (US)

(73) Assignee: Texas Instruments Incorporated, Dallas, TX (US)

( * ) Notice: Subject to any disclaimer, the term of this patent is extended or adjusted under 35 U.S.C. 154(b) by 1035 days.

(21) Appl. No.: 10/192,439

(22) Filed: Jul. 10, 2002

(65) Prior Publication Data

US 2003/0021289 A1    Jan. 30, 2003

Related U.S. Application Data

(60) Provisional application No. 60/308,715, filed on Jul. 30, 2001.

(51) Int. Cl.
*H04J 1/16* (2006.01)
(52) U.S. Cl. .................... 370/253; 370/349
(58) Field of Classification Search ............ 370/232, 370/349, 394, 235, 253, 389, 310, 350
See application file for complete search history.

(56) References Cited

U.S. PATENT DOCUMENTS 5,748,676 A   5/1998  Mahany
6,563,858 B1*  5/2003  Fakatselis et al. ......... 375/148

FOREIGN PATENT DOCUMENTS

WO   WO 99 00927 A   1/1999
WO   WO 99 49586 A   9/1999

OTHER PUBLICATIONS

Webster M. et al., "Reuse of 802.11b Preambles with HRb OFDM", IEEE 802.11-00/390, Nov. 1, 2000, XP002217331, Retrieved from the (cont. from above) Internet: http://grouper.ieee.org/groups/802/11/Documents/DT351-400, html, retrvd on Oct. 18, 2002, p. 15-16, 21.
Nee Van R., et al., "New High-Rate Wireless LAN Standards", IEEE Communications Mag., IEEE Service Ctr., Piscataway, N.J. US, vol. 37, No. 12, (cont. from above) Dec. 1999, pp. 82-88, XP000908328, ISSN: 0163-6804, p. 260, left-hand col., line 1, right-hand col., line 12.
Van Nee R., "A New OFDM Standard for High Rate Wireless LAN in the 5 GHz Band", Vehicular Technology Conference, 1999. VTC 1999-Fall. (cont. from above) IEEE VTS 50th Amsterdam Netherlands Sep. 19-22, 1999, Piscataway, NJ, USA, IEEE, US, Sep. 19, 1999, pp. 258-262, XP010352876, (cont. from above) ISBN: 0-7803-5435-4, p. 83, left-hand col., line 1—line 34, figure 1.

* cited by examiner

*Primary Examiner*—Brenda Pham
(74) *Attorney, Agent, or Firm*—Steven A. Shaw; W. James Brady; Frederick J. Telecky, Jr.

(57) ABSTRACT

A method of increasing the data rate in a wireless Ethernet employs clock switching between the preamble and the encoded data portion of a packet structure. A shift block includes a tail sequence and a head sequence that is inserted between the preamble and the encoded data portion. The clock switching occurs within the shift block between the tail and the head sequences. The tail sequence and the head sequence are each constrained to be a fixed sequence.

10 Claims, 4 Drawing Sheets

METHOD OF INCREASING DATA RATE IN A WIRELESS DATA COMMUNICATION NETWORK VIA CLOCK SWITCHING

This application claims priority under 35 USC § 119(e)(1) of provisional application Ser. No. 60/308,715, filed Jul. 30, 2001.

BACKGROUND OF THE INVENTION

1. Field of the Invention

This invention relates generally to wireless communications, and more particularly to a method of increasing the data rate in a wireless data communication network (e.g., Ethernet) via clock switching.

2. Description of the Prior Art

The existing IEEE 802.11b standard, and the Texas Instrument Incorporated (herein after TI) proposed 22 Mbps extension to the standard, are based upon an 11 Msps symbol rate and a bandwidth occupancy of 20 MHz. In terms of modern digital communications techniques such as pulse shaping and adaptive equalization, a more aggressive symbol rate in the same bandwidth is practical. In order to deal with inter-operability with existing networks however, the structure of the preamble, including the symbol rate of the preamble, must not change.

In view of the foregoing, it would be desirable to have a method of transmitting a preamble, e.g. 11 Msps preamble, followed by a higher symbol rate encoded data rate.

SUMMARY OF THE INVENTION

The present invention is directed to a method of increasing the data rate in a wireless data communication network such as Ethernet via clock switching. The method employs clock switching between the preamble and the encoded data portion of a packet structure. A shift block includes a tail sequence and a head sequence that is inserted between the preamble and the encoded data portion. The clock switching occurs within the shift block between the tail and the head sequences. The tail sequence and the head sequence are each constrained to be a fixed sequence.

One embodiment of the present invention is directed to a method of increasing the data rate in a wireless data communication network wherein the method comprises the steps of:

constraining an end portion of a preamble associated with a data packet to be a first fixed sequence;

constraining a beginning portion of encoded data associated with the data packet to be a second fixed sequence;

transmitting the data packet preamble at a first clock rate;

changing the first clock rate to a second clock rate between the first fixed sequence and the second fixed sequence; and transmitting the encoded data at the second clock rate.

According to another embodiment of the present invention, a method of increasing the rate of data transmission in a wireless communication network comprises the steps of:

transmitting at a first clock rate, a data packet preamble associated with a data packet and having an end portion comprising a first fixed sequence; and transmitting at a second clock rate, encoded data associated with the data packet and having a beginning portion comprising a second fixed sequence.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
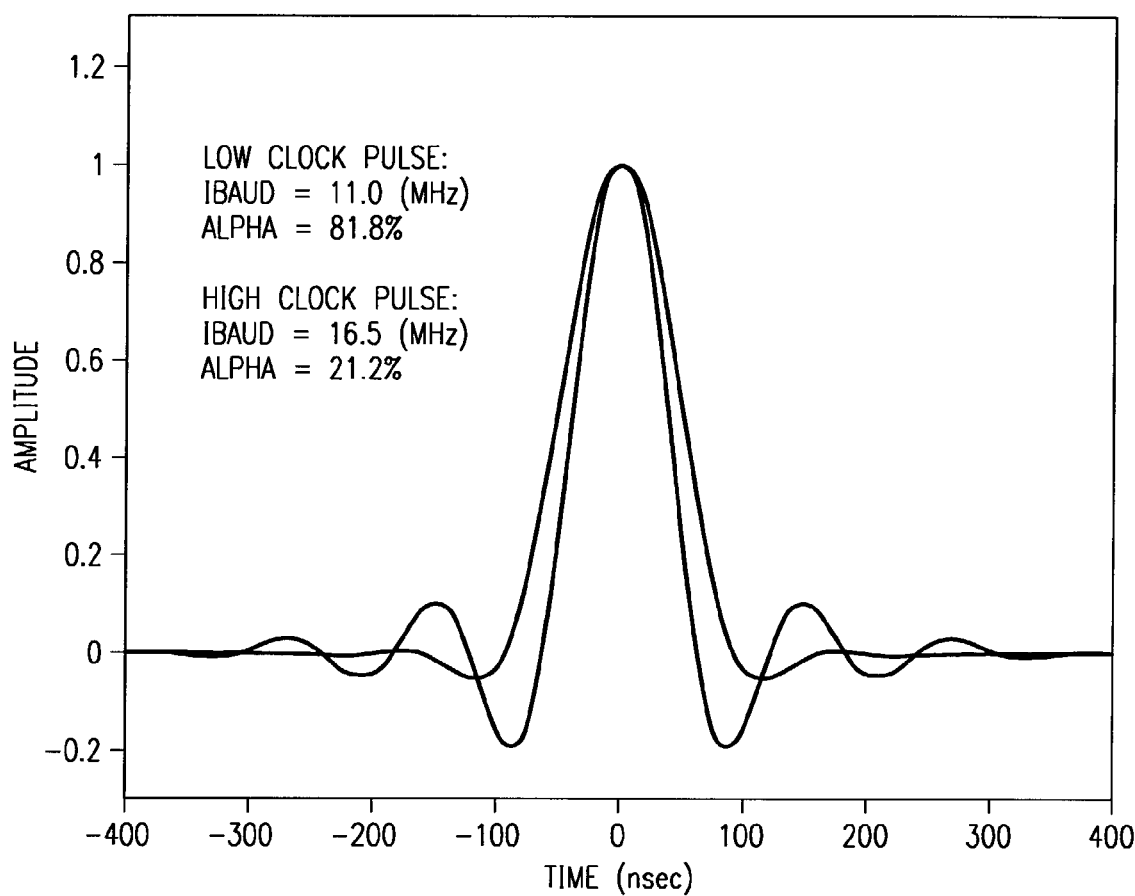
FIG. 1 is a diagram illustrating a raised cosine pulse.

The existing IEEE 802.11b standard, and the TI proposed 22 Mbps extension to the standard, are based upon an 11 Msps symbol rate and a bandwidth occupancy of 20 MHz. The ratio of bandwidth to symbol rate, 20/11=1.818, implies an excess bandwidth parameter $\alpha=81.8\%$. This parameter, which expresses the amount of "waveform spreading", can be modeled with a (complex) baseband transmission signal of the form $$x(t) = \sum_{k=0}^{n-1} c_k p(t-kT)$$

where the complex samples $\{c_k\}$ represent the encoded data and the real valued pulse shape p(t) determines the spectrum of the signal. In IEEE 802.11b, the samples $\{ck\}$ are drawn from the QPSK signal set while the 22 Mbps samples belong to the 8-PSK signal set. For a Nyquist pulse, the pulse shape satisfies the equation $$p(kT) = \begin{cases} 1 & k=0 \\ 0 & k \neq 0 \end{cases}$$

where k is an integer. One example of such a pulse shape, known as a raised cosine pulse is illustrated in FIG. 1. In this example, a raised cosine pulse occupies a 20 MHz bandwidth for two cases: an α=81.8% excess bandwidth with T=1/(11×10⁶), enumerated as raised cosine pulse 10, and an α=21.2% excess bandwidth with T=1/(16.5×10⁶), enumerated as raised cosine pulse 12. This second pulse 12 increases the symbol rate by 50% when compared to the first pulse 10; yet it maintains the same 20 MHz bandwidth.

Figure 2A:
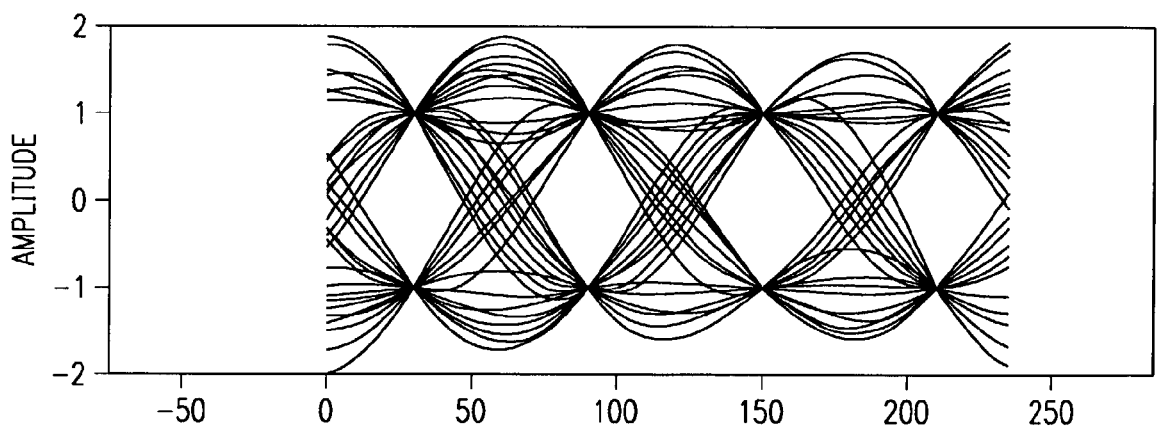
FIG. 2A is an eye diagram illustrating a 20 MHz signal with a 16.5 Msps symbol rate.
Figure 2B:
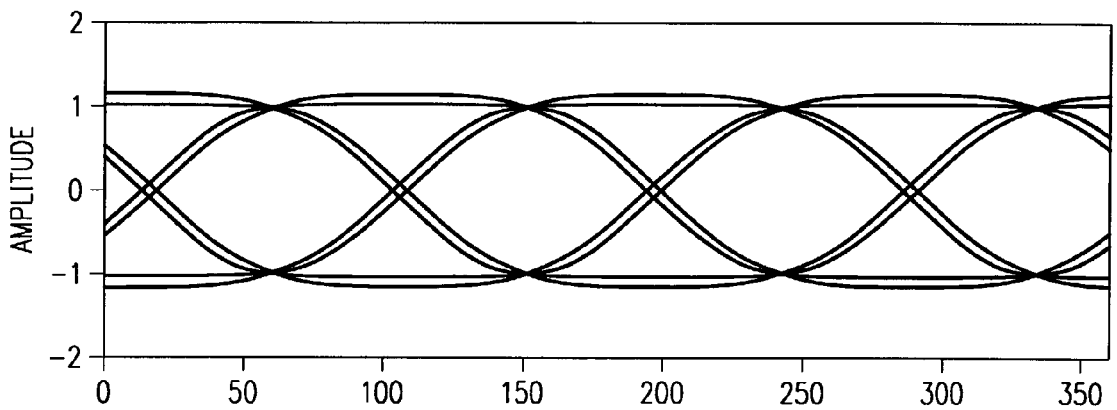
FIG. 2B is an eye diagram illustrating a 20 MHz signal with an 11 MHz symbol rate.

The effect of changing the symbol clocking while maintaining a fixed bandwidth can be observed in the "eye diagrams" depicted in FIGS. 2A and 2B. Specifically, FIG. 2B is an eye diagram illustrating a 20 MHz signal with an 11 Msps symbol rate; while FIG. 2A is an eye diagram illustrating a 20 MHz signal with a 16.5 MHz symbol rate. These eye diagrams demonstrate that a faster symbol rate implies a symbol period that is reduced to ⅔ the symbol period length of that associated with the slower symbol rate. Further, the smaller α=21.2% waveform shown in FIG. 2A depicts a more complex structure that relates to the fact that the signal pulse shape has a more intricate behavior.

A method to improve the throughput of transmission while maintaining interoperability with existing networks is achieved with a changing of the symbol clock after the packet preamble. This method of improving the date rate allows for the reuse of modulation and encoding methods of the IEEE standard and TI extension discussed herein before. Specifically, the three PBCC® modes that operate at 5.5 Mbps, 11 Mbps and 22 Mbps without clock switching, transmit at the rate of 8.25 Mbps, 16.5 Mbps and 33 Mbps when the clock is switched from the 11 Mbps used in the header to 16.5 Mbps during the data portion of the packet.

In a clock switched system, two baseband signals are generated such as $$x_1(t) = \sum_{k=0}^{n-1} c_k p_1(t - kT_1)$$

and $$x_2(t) = \sum_{k=0}^{m-1} c_k p_2(t - kT_2)$$

where $x_1(t)$ represents the initial transmission (e.g., the preamble) and $x_2(t)$ represents the subsequent transmission. The transmitted baseband signal is the sum $$x(t) = x_1(t) + x_2(t - \tau)$$

where the second signal is delayed by $\tau = (n-1)T_1 + T_2$ to align with the end of the first.

Figure 3A:
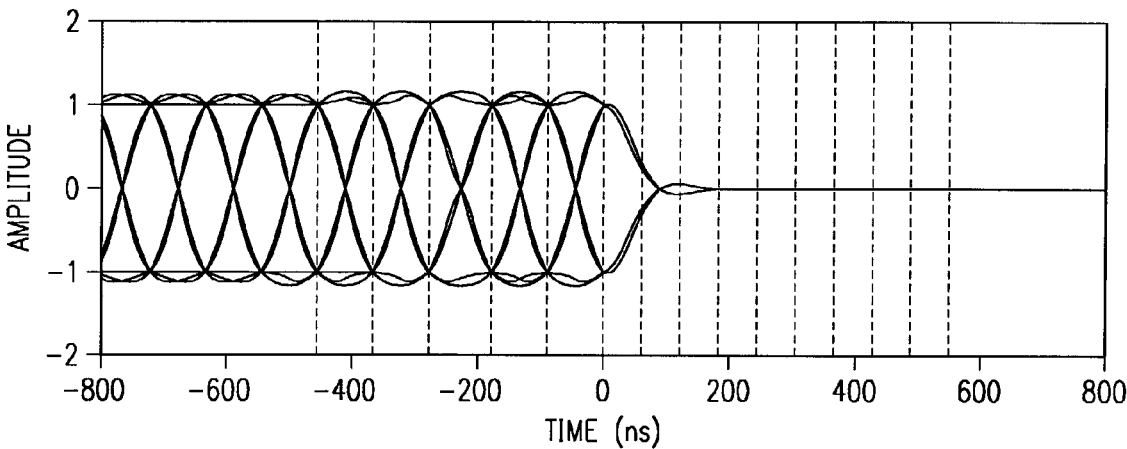
FIGS. 3A and 3B are diagrams illustrating waveform effects due to clock switching from 11 Msps to 16.5 Msps using a fixed 20 MHz bandwidth.
Figure 3B:
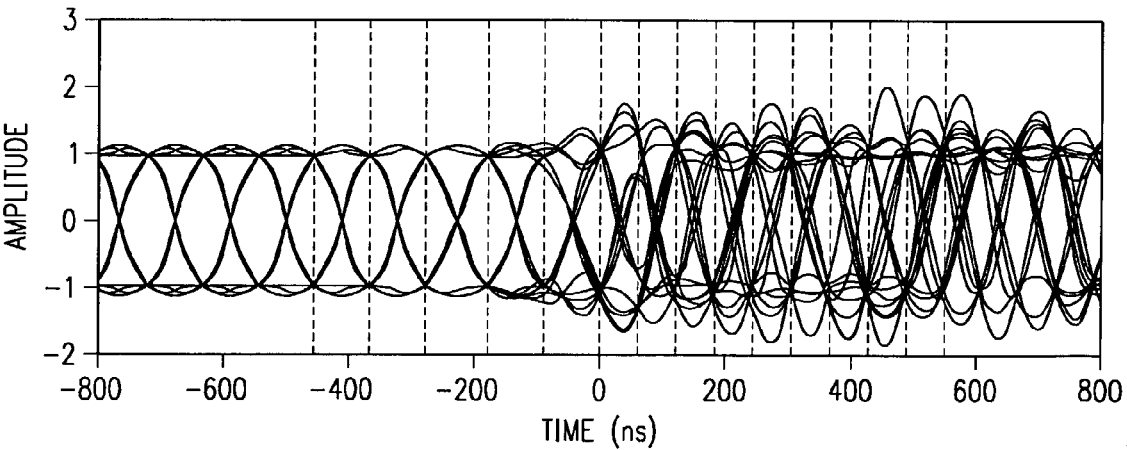
Figure 4A:
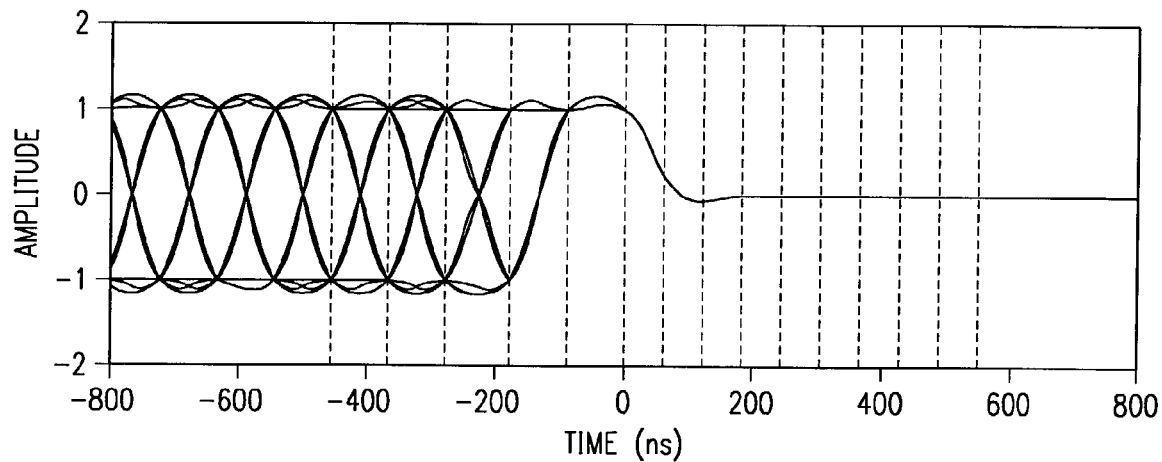
FIGS. 4A and 4B are diagrams illustrating waveform effects due to clock switching from 11 Msps to 16.5 Msps using a guard band having a head length 2 and a tail length 3.
Figure 4B:
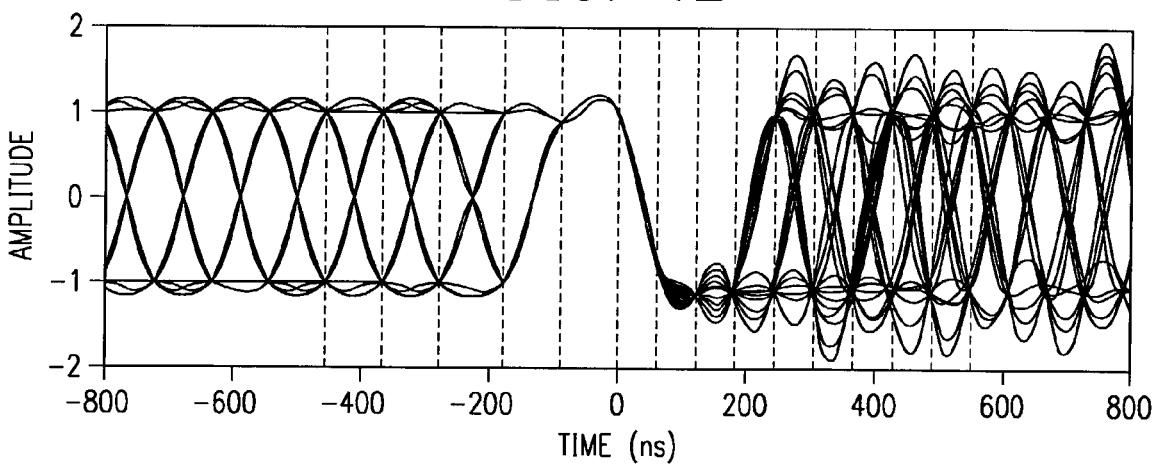
Figure 5A:
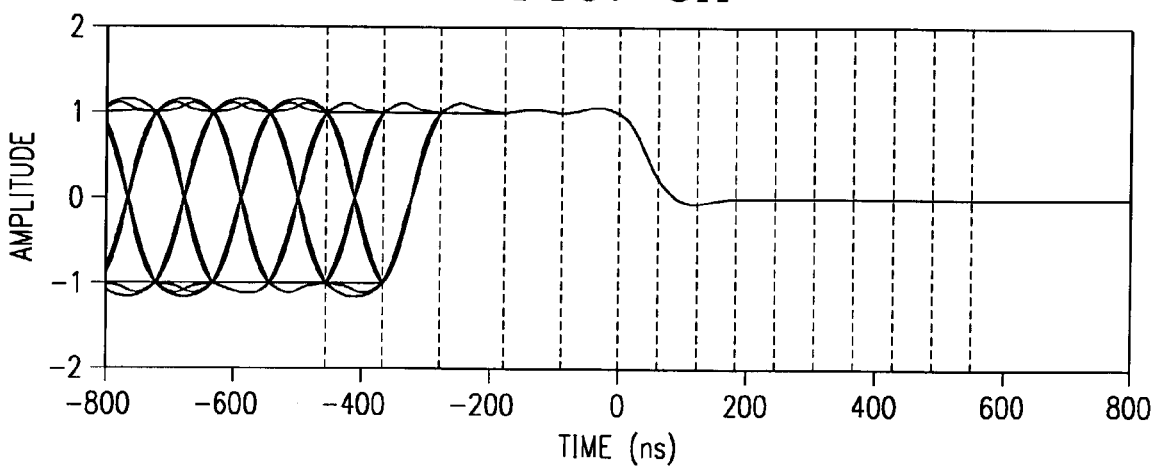
FIGS. 5A and 5B are diagrams illustrating waveform effects due to clock switching from 11 Msps to 16.5 Msps using a guard band having a head length 4 and a tail length 6.
Figure 5B:
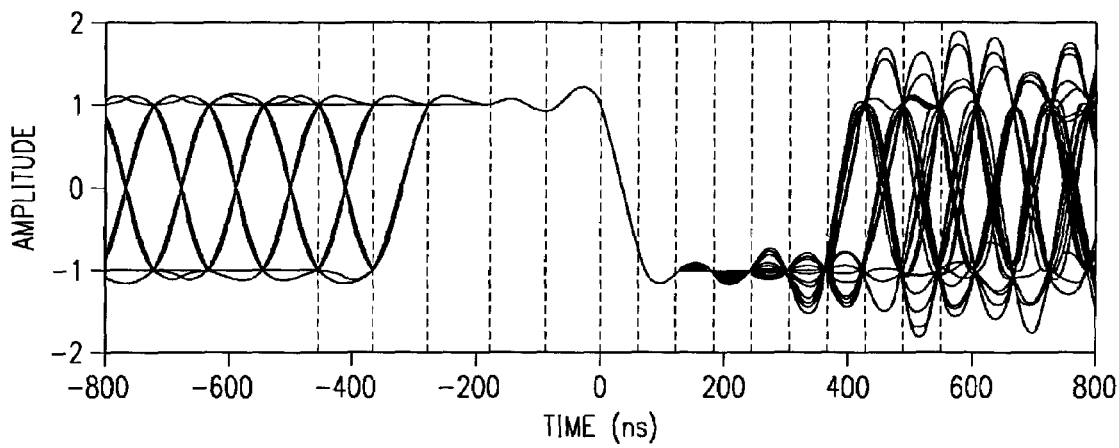
Figure 8:
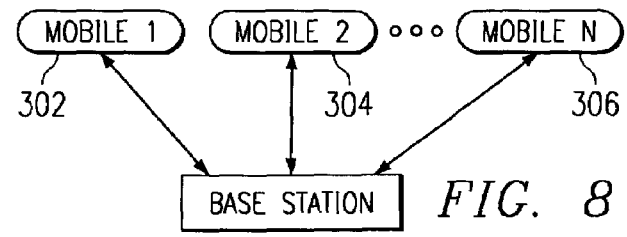
FIG. 8 is a diagram illustrating one embodiment of a wireless data communication network.

FIGS. 3A and 3B are diagrams illustrating waveform effects due to clock switching from 11 Msps to 16.5 Msps using a fixed 20 MHz bandwidth. Specifically, FIG. 3B shows the composite x(t) signal while FIG. 3A shows the two component signals $x_1(t)$ and $x_2(t-\tau)$. Each signal consists of random data. The inter-symbol interference that occurs due to the change in the clock rate can be easily seen in FIG. 3B. This distortion effects both the end of the first signal as well as the beginning of the second signal. In order to avoid errors at the receiver (enumerated as 302, 304, 306 in FIG. 8), one embodiment of the present inventive method constrains the end of the first signal (the "Tail") to be a fixed sequence and further constrains the beginning of the second signal (the "Head") to be a fixed sequence. This technique is demonstrated in FIGS. 4A and 4B that are diagrams illustrating waveform effects due to clock switching from 11 Msps to 16.5 Msps using a guard band having a head length 2 and a tail length 3. FIGS. 5A and 5B are more diagrams illustrating waveform effects due to clock switching from 11 Msps to 16.5 Msps, but instead, using a guard band having a head length 4 and a tail length 6. In these two cases, the head is chosen to be a constant (+1) sequence and the tail is chosen to be a constant 180° rotation of the head (−1). This selection has the desirable property that a single well defined transition occurs at the clock change boundary.

Figure 6:
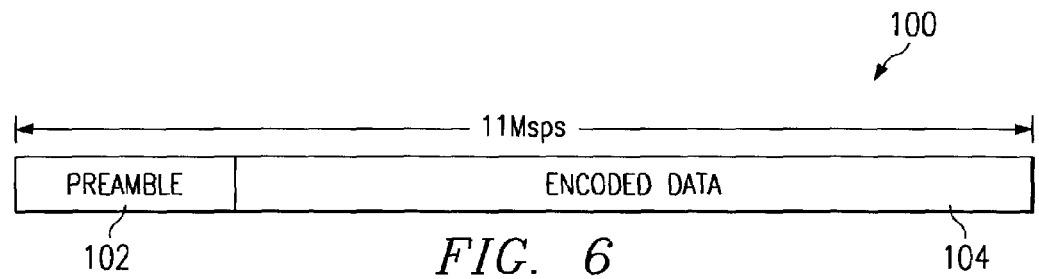
FIG. 6 is a diagram illustrating a packet structure without clock switching.

FIG. 6 is a diagram illustrating a packet structure 100 without clock switching. The packet structure 100 can be seen to have a preamble 102 and an encoded data portion 104. The preamble 102 uses a common format that is detectable by all users on the associated network (enumerated as 300 in FIG. 8), while the encoded data portion need only be decodable by the intended receiver (302, 304, 306).

Figure 7:
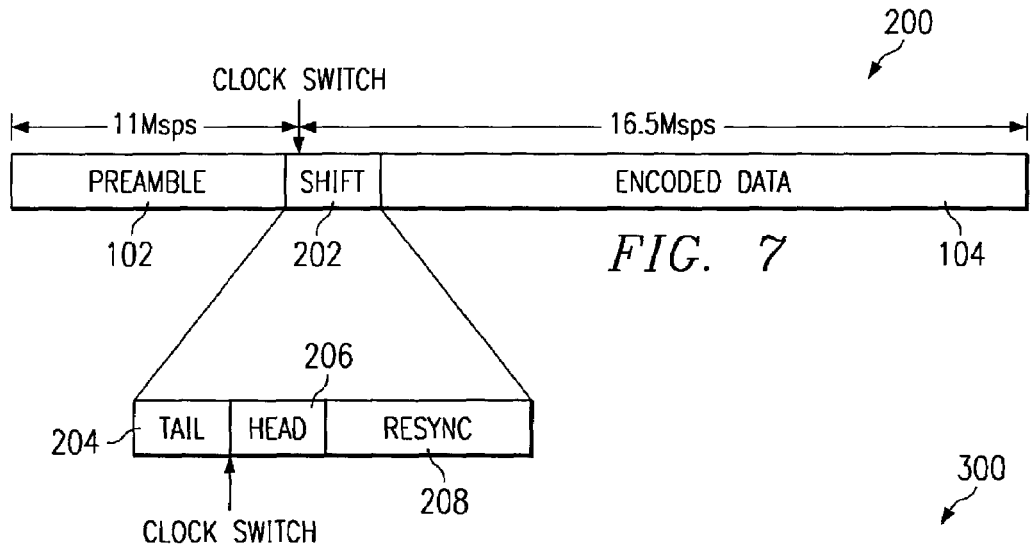
FIG. 7 is a diagram illustrating a packet structure with clock switching.

FIG. 7 is a diagram illustrating a clock switch packet structure 200 with clock switching according to one embodiment of the present invention. The clock switch packet structure 200 is obtained via insertion of a "shift" block 202 between the preamble 102 and the encoded data 104. The clock rate switch occurs within the shift block 202 between the tail sequence 204 and the head sequence 206. Preferably, a ReSync sequence 208 is employed to aid the receiver (302, 304, 306) in re-calibrating tracking loops and other dynamic receiver elements such as adaptive filters and the like.

The present method then, represents a significant advancement in the art of wireless data communications such as Ethernet. This invention has been described in considerable detail in order to provide those skilled in the equalizer art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, although various embodiments have been presented herein with reference to particular communication protocols, the present inventive methods are not limited to a particular communication protocol as used herein.

What is claimed is:

1. A method of increasing the data rate in a wireless data communication network, the method comprising the steps of:
   constraining an end portion of a preamble associated with a data packet to be a first fixed sequence of a constant plus one sequence;
   constraining a beginning portion of encoded data associated with the data packet to be a second fixed sequence, wherein the step of constraining a beginning portion of encoded data associated with the data packet to be a second fixed sequence comprises the step of constraining a beginning portion of encoded data to be a constant 180 degree rotation of the constant plus one sequence;
   transmitting the data packet preamble at first clock rate;
   changing the first clock rate to a second clock rate between the first fixed sequence and the second fixed sequence; and
   transmitting the encoded data at the second clock rate.

2. The method according to claim 1 wherein the step of changing the first clock rate to a second clock rate between the first fixed sequence and the second fixed sequence comprises the step of changing the first clock rate from 11 MWz to a clock rate of 16.5 MHz.

3. The method according to claim 1 wherein the step of changing the first clock rate lo a second clock rate between the first fixed sequence and the second fixed sequence comprises the step of increasing the first clock rate to a faster clock rate.

4. The method according to claim 1 further comprising the step of transmitting a resynchronization sequence immediately following transmission of the beginning portion of the encoded data and before transmission of the remaining portion of the encoded data.

5. A method of increasing the rate of data transmission in a wireless communication network, the method comprising the steps of:
   transmitting at a first clock rate; a data packet preamble associated with a data packet and having an end portion comprising a first fixed sequence of a constant plus one sequence; and
   transmitting at a second clock rate, encoded data associated with the data packet and having a beginning portion comprising a second fixed sequence, wherein the step of transmitting at the second clock rate, encoded data associated with the data packet and having a beginning portion comprising a second fixed sequence, comprises transmitting a beginning portion constrained to be a constant 180 degree rotation of the first fixed sequence.

6. The method according to claim 5 further comprising the step of changing the first clock rate to the second clock rate between the end portion and the beginning portion.

7. The method according to claim 6 wherein the step of changing the first clock rate to the second clock rate comprises the step of changing the first clock rate to a faster clock rate.

8. The method according to claim 6 wherein the step of changing the first clock rate to the second clock rate comprises the step of changing the first clock rate from 11 MHz to 16.5 MHz.

9. The method according to claim 5 wherein the step of transmitting at the second clock rate, encoded data associated with the data packet and having a beginning portion comprising a second fixed sequence, comprises transmitting a beginning portion constrained to be a constant 180" rotation of the constant plus one sequence.

10. The method according to claim 5 further comprising the step of transmitting a resynchronization sequence immediately following transmission of the beginning portion of the encoded data and before transmission of the remaining portion of the encoded data.

* * * * *